United States Patent [19]

Aonuma et al.

[11] Patent Number: 5,856,917
[45] Date of Patent: *Jan. 5, 1999

[54] ELECTRIC POWER DEVICE WITH IMPROVED POWER FACTOR

[75] Inventors: Kenichi Aonuma; Shigetaka Maeyama, both of Tokyo; Hiromitsu Hirayama, deceased, late of Tokyo; Hiroko Hirayama, heiress; Hiroshi Hirayama, heiress, both of Funabashi; Hisahiko Abe, Tokyo, all of Japan

[73] Assignee: TDK Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 604,964

[22] PCT Filed: Sep. 4, 1995

[86] PCT No.: PCT/JP95/01753

§ 371 Date: Jun. 18, 1996

§ 102(e) Date: Jun. 18, 1996

[87] PCT Pub. No.: WO96/08073

PCT Pub. Date: Mar. 14, 1996

[30] Foreign Application Priority Data

Sep. 5, 1994 [JP] Japan ................................. 6-210962

[51] Int. Cl.[6] .................................................. H02M 5/452
[52] U.S. Cl. ................................ 363/21; 363/89; 323/222
[58] Field of Search ............................. 323/222; 363/21, 363/89, 56, 124, 97

[56] References Cited

U.S. PATENT DOCUMENTS

| | | | |
|---|---|---|---|
| 4,683,529 | 7/1987 | Bucher, II | 363/89 |
| 5,406,471 | 4/1995 | Yamanaka | 323/222 |
| 5,489,837 | 2/1996 | Arakawa | 323/222 |
| 5,502,628 | 3/1996 | Arakawa | 363/20 |

(List continued on next page.)

FOREIGN PATENT DOCUMENTS

| | | |
|---|---|---|
| 2-254975 | 10/1990 | Japan . |
| 3-207268 | 9/1991 | Japan . |
| 4-127875 | 4/1992 | Japan . |
| 5-91731 | 4/1993 | Japan . |

OTHER PUBLICATIONS

"Application of a Dither Rectifying Circuit to a Switching Type Power Device" by Isao Takahashi; pp. 1–13; from a seminar entitled Power Factor Improving Circuit For Switching Type Power Device.

*Primary Examiner*—Edward H. Tso
*Assistant Examiner*—Derek J. Jardieu
*Attorney, Agent, or Firm*—Frishauf, Holtz, Goodman, Langer & Chick, P.C.

[57] ABSTRACT

Device including an input rectifying circuit 2 for effecting a full wave rectification on an AC input, and an output converter which includes a transforming device 11 having a primary winding 11a and a secondary winding 11b, the primary winding being connected through an inductor 16 with paired outputs of the input rectifying circuit, the secondary winding being connected through an output rectifying circuit with a load. Switching element 18 is controlled by a control circuit 20 to operate between ON and OFF states, and capacitor 19 is connected with the input rectifying circuit and the transforming device so as to be charged during the OFF state period of the switching element 18 through a charging circuit including the inductor 16, and to discharge during the ON state period through the primary winding 11a of the transforming device 11. The control circuit 20 controls the switching element to operate in an ON-OFF manner with a frequency faster than the frequency of the AC input. A second switching element 31 is connected in series with the inductor 16 to paired outputs of the input rectifying circuit 2 and through a diode 17 with a capacitor charging circuit. An interrupting device renders the second switching element non-conductive when the current through the second switching element exceeds a predetermined value.

25 Claims, 6 Drawing Sheets

U.S. PATENT DOCUMENTS

| | | | |
|---|---|---|---|
| 5,508,904 | 4/1996 | Hara | 363/21 |
| 5,515,257 | 5/1996 | Ishii | 363/21 |
| 5,515,261 | 5/1996 | Bogdan | 363/89 |
| 5,519,306 | 5/1996 | Itoh et al. | 323/222 |
| 5,568,041 | 10/1996 | Hesterman | 323/222 |
| 5,617,013 | 4/1997 | Cozzi | 323/222 |
| 5,627,708 | 5/1997 | Lee | 361/18 |
| 5,734,564 | 3/1998 | Brkovic | 363/21 |
| 5,757,635 | 5/1998 | Seong | 363/89 |
| 5,771,168 | 6/1998 | Liao et al. | 323/222 |

FIG. 1

FIG. 2 (a)
Input voltage and input current waveform

FIG. 2 (b)
Input current waveform

FIG. 2 (c)
Waveform of current in switching element 18

FIG. 2 (d)
Waveform of current in switching element 31

ELECTRIC POWER DEVICE WITH IMPROVED POWER FACTOR

BACKGROUND ART

The present invention relates to a DC power device adapted for receiving AC input and generating DC output. More specifically, the present invention relates to a switching type electric power device wherein an input from a rectifying circuit, which is adapted for rectifying AC input, is subjected by a switching element to ON-OFF control and then to a voltage increase or decrease by a transforming device, and thereafter converted into DC power by another rectifying circuit. The present invention further relates to a power factor correction control device which is adapted for use in a power device for correcting the power factor.

A switching type electric power device of the type described above includes an input rectifying circuit having diodes connected to form a bridge circuit, the output of the rectifying circuit is connected to an input capacitor. The output of the input rectifying circuit is connected to a primary winding of an output converter having a transforming device which is adapted for increasing or decreasing the output voltage of the input rectifying circuit. A switching element is provided for subjecting the output of the input rectifying circuit, which is connected with the primary winding of the converter, to an ON-OFF control. The transforming device of the output converter has a secondary winding which is connected through an output rectifying circuit to a load.

In a circuit provided with such an input capacitor, input current flows only during a period wherein the input capacitor is being charged, and the current is interrupted during a period wherein the input voltage is below the voltage of the input capacitor. Therefore, even when the AC input voltage is of a sinusoidal shape, the current wave form assumes a steep shape resulting in a decrease in power factor and producing harmonic components.

It has been realized and recognized as a problem that when a commercial electric power source is utilized as the AC input power source the harmonic components produced in the switching power device are allowed to flow into the commercial power source lines to thereby distort the commercial power source. Thus, in recent years, a problem in the field of the switching power device has been to take into account this tendency and to suppress the generation of such harmonic components.

In order to solve the problem, there has been proposed to provide a power device which utilizes a rectifying circuit of a type called DITHER system wherein an AC input is subjected by means of a switching element to ON-OFF control. A typical example of a switching type power device utilizing a DITHER type rectifying circuit is the one which is described as the voltage raising circuit example 1 described in the article "Application of a DITHER Rectifying Circuit to a Switching Type Power Device" by Isao TAKAHASHI in the text for a seminar entitled "Power factor correction Circuit for Switching Type Power Device" held by the Japan Industrial Technology Center on Nov. 26 and 27, 1992.

In the known circuit, the input rectifying circuit adapted to receive AC power as an input has one of output connected through an inductor and a diode with one end of a primary winding of the transforming device, the other end of the primary winding being connected through a switching element with the other of the outputs of the input rectifying circuit. A capacitor is connected in parallel with the primary winding of the transforming device and the switching element. A point between the inductor and the diode is connected through a second diode with a point between the primary winding and the switching element. The switching element is actuated by means of a control circuit to conduct ON-OFF operation with a frequency faster than the frequency of the AC input whereby current proportional to the input voltage is allowed to flow into the capacitor during the ON period of the switching element resulting in an improvement of power factor and suppression of harmonic components.

The Japanese Laid-Open Patent Nos. Hei 3-207268 and Hei 4-127875 also disclose switching type power devices which utilize a similar DITHER type rectifying circuit.

It has been recognized that the switching type power device utilizing the aforementioned DITHER type rectifying circuit is advantageous in that a high power factor can be obtained and harmonic components can be suppressed with a circuit of a relatively simple structure. It should however be noted that the circuit of this type has a disadvantage in that the capacitor voltage changes to a significant degree depending on variations in the input voltage and the load. It has therefore been required in order to accommodate for wide ranges of variations in the input voltage and the load to vary the frequency of the control circuit for providing the ON-OFF control of the switching element in accordance with the changes in the input voltage and the load so that the variations in the capacitor voltage can be minimized. It should however be noted that making the frequency of the control circuit variable as described will make it necessary to have the transforming device, the inductor and the input and output filters of larger capacities which lead to a difficulty in control.

DISCLOSURE OF THE INVENTION

The present invention has an object to provide a switching type electric power device which can accomplish an improvement in power factor with a circuit of a simple structure, can suppress voltage variations in the capacitor without changing the control frequency, and can accommodate for wide ranges of variations of the input voltage and the load.

It is another object of the present invention to provide a power factor correction control device which is constructed as a unit and can improve power factor of a electric power device by connecting to the power factor correction circuit of the power device.

According to the present invention, in order to accomplish the aforementioned objects an improvement is made on a switching type electric power device comprising an input rectifying circuit for effecting full wave rectification to AC input, an output converter comprising a transforming device having a primary winding and a secondary winding, the primary winding being connected with paired outputs of the input rectifying circuit, the secondary winding being connected through an output rectifying circuit with a load, a first switching element adapted to be controlled by a control circuit to effect ON-OFF control on current to be supplied to the primary winding and a capacitor connected with the input rectifying circuit and the primary winding of the transforming device so that it is charged during OFF periods of the first switching element and discharged through the primary winding of the transforming device during ON periods, and a power factor correction circuit having an energy storing device connected with the paired outputs of the input rectifying circuit so as to be controlled by a second switching element so that energy stored by the energy storing device is used to charge the capacitor under the control of the second switching element. In the power device, the control circuit controls the first switching element to effect ON-OFF operations with a frequency faster than the frequency of AC input, and the second switching element is also controlled to effect ON-OFF operations by means of the control circuit or another circuit such as an oscillating circuit in a manner synchronized with the first switching element. According to the features of the present invention, a shut-off device is provided to make the second switching element non-conductive when current through the second switching element exceeds a predetermined value.

According to one aspect of the present invention, the switching power device is of a type which includes an input rectifying circuit for effecting a full wave rectification of AC input, an output converter having a transforming device with a primary winding and a secondary winding, the primary winding being connected at one end through an inductor and a first diode with one of paired outputs of the input rectifying circuit and at the other end with the other of the outputs of the rectifying circuit through a switching element which is adapted to be controlled by a control circuit to effect an ON-OFF operation to control current to the primary winding, a capacitor connected in parallel with the primary winding and the switching element so that it discharges during ON periods of the switching element through the primary winding of the transforming device, the control circuit being adapted to control the switching element with a frequency faster than the frequency of the AC input.

In this power device, there is provided a second switching element connected with the paired outputs of the input rectifying circuit in series with the inductor, and an ON-OFF control device is provided for controlling the second switching device to effect ON-OFF operations with a frequency faster than the frequency of the AC input to thereby charge the capacitor during the OFF periods through the inductor and the diode. According to the features of the present invention, the switching type power device includes a shut-off device to make the second switching element non-conductive when the current through the second switching element exceeds a predetermined value.

In the device of the present invention, it is preferable to control the first and second switching elements to effect ON-OFF operations in a synchronized manner, and it is more preferable to control the second switching device by means of the control device for the output converter. It is also preferable in the present invention to detect the voltage of the aforementioned capacitor so as to vary the aforementioned predetermined value under which the second switching element is made conductive in accordance with the capacitor voltage. Alternatively, in lieu of the control based on the capacitor voltage, or in addition to this control, it may be preferable to detect the input voltage from the input rectifying circuit so that the aforementioned predetermined value under which the second switching element s made non-conductive is varied in accordance with the detected input voltage.

According to a preferable aspect of the present invention, the shut-off device is comprised of a current detecting device fro detecting current through the second switching element, comparator device for comparing the detected output of the current detecting device with a reference value, and a switch for making the second switching element non-conductive when the value detected by the current detecting device exceeds the reference value. In this instance, the reference voltage of the comparator device or the value detected by the current detecting device may be changed in accordance with one or both of the capacitor voltage and the input voltage from the input rectifying circuit.

In accordance with the switching type electric power device, the power source is in a short-circuited state when the second switching element is in a conductive state so that the capacitor is discharged during this period if the first switching element is conductive to thereby allow current to flow through the primary winding of the transforming device. The inductor stores energy during this period. When both the first and second switching element are non-conductive, the current through the primary winding of the transforming device is interrupted so that the energy stored in the inductor is used to charge the capacitor through the diode. In this instance, the charge voltage in the capacitor is determined in accordance with the energy stored by the inductor. The control of the switching element to effect ON-OFF operations with a frequency faster than the frequency of the AC input makes it possible to increase the capacitor charge voltage to a value close to the peak value in the conductive period of the switching element.

According to the present invention, detection is made on the current through the second switching element and the second switching element is made non-conductive when the current exceeds a predetermined value. With this control, the current through the inductor is interrupted so that energy is not stored in the inductor beyond this value. Thus, the capacitor charge voltage during the OFF period of the first switching element in the next operating cycle is limited to thereby prevent excessive capacitor charge.

BRIEF DESCRIPTION OF THE DRAWINGS

FIG. 5 is a diagram showing the relationship between the input voltage, the input capacitor voltage and the output voltage respectively in the embodiment of the present invention and a conventional device; and, FIGS. 6(a)–(c) show vies of an embodiment having the power factor correction control circuit structured as a unit, wherein (a) is a perspective view showing components of the power factor correction control circuit mounted on a board, (b) a perspective view showing the board having components mounted thereon and housed in a casing to form a unit, and (c) a perspective view showing the power factor correction control circuit formed as a unit and mounted on a main board of a power device.

BEST MODE FOR CARRYING OUT THE INVENTION

Figure 1:
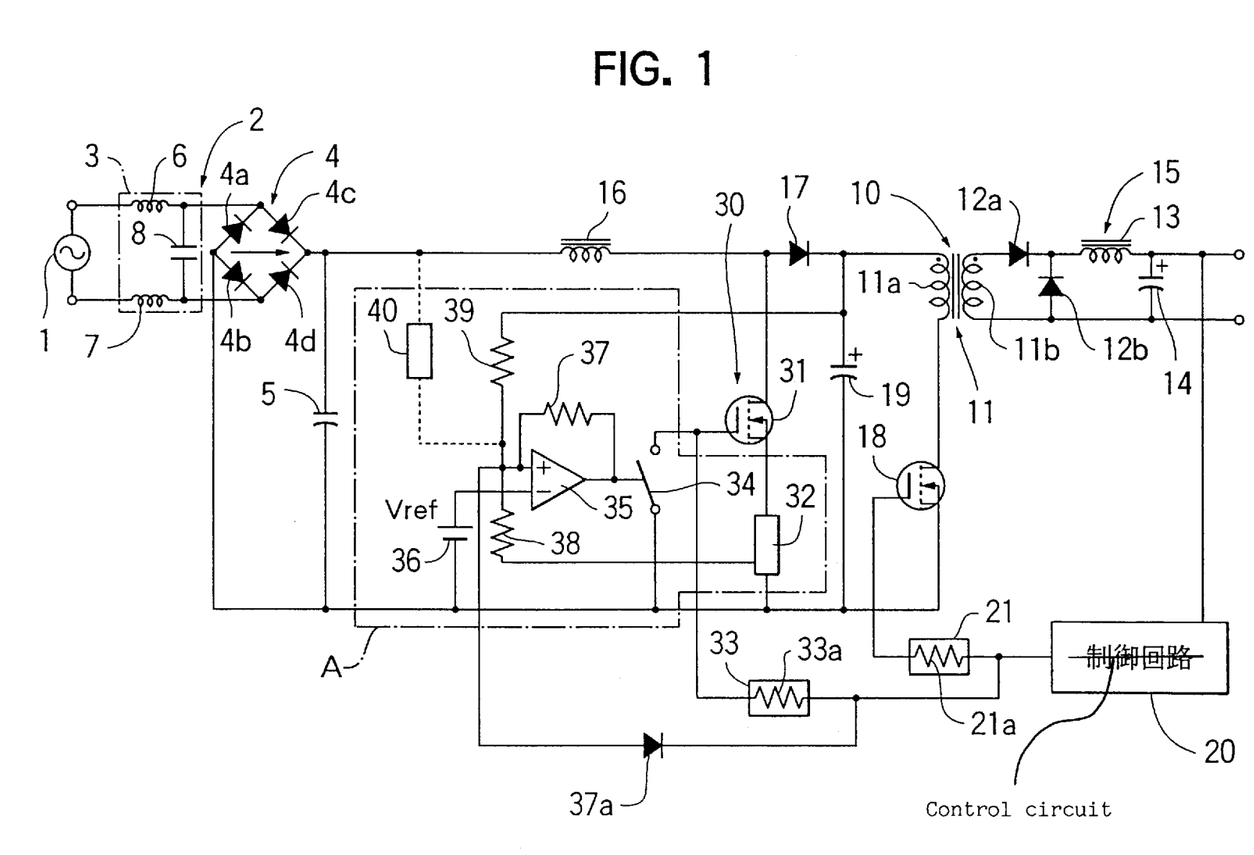
FIG. 1 is a circuit diagram showing the overall arrangement of a switching type power device in accordance with one embodiment of the present invention.

Embodiments of the present invention will now be described with reference to the drawings. Referring first to FIG. 1, there is shown an input rectifying circuit 2 in accordance with an embodiment which comprises an AC filter 3 connected with an AC power source 1 such as a commercial AC power source through a power switch not shown, a rectifier 4 connected with the AC filter 3, and an input capacitor 5 connected with paired outputs of the rectifier 4. The AC filter 3 is comprised of a pair of inductors 6 and 7, and a capacitor 8 connected between the inductors. The rectifier 4 includes four diodes 4a, 4b, 4c and 4d which are connected to form a bridge.

There is provided an output converter 10 including a transforming device 11 having a primary winding 11a and a secondary winding 11b. The secondary winding 11b of the transforming device 11 is connected with an output rectifier 15 comprising a pair of diodes 12a and 12b, an output inductor 13 and a capacitor 14. The primary winding 11a is connected at one of its terminals through an input inductor 16 and a diode 17 with one of the paired outputs of the input rectifier 2, and at the other terminal through a switching element 18 with the other of the outputs of the input rectifier 2. An input capacitor 19 is connected in parallel with the primary winding 11a of the transforming device 11 and the switching element 18. A control circuit 20 is connected through a driving circuit 21 with the gate of the switching element 18 for controlling the switching element 18 to effect ON-OFF operations. The driving circuit 21 may function just to relay signals from the control circuit 20 and most simply it may be comprised of a resistor 21a.

The control circuit 20 is provided for actuating the switching element 18 to move between ON and OFF states so that current pulse is allowed to flow to the primary winding 11a of the transforming device 11 during a conductive period of the switching element 18. Energy is stored in the inductor 16 during the conductive period of the switching element 18 by the current through the inductor 16, and the stored energy produces current to the capacitor 19 during the non-conductive period of the switching element 18 to thereby charge the capacitor 19. In the period wherein the switching element 18 is conductive, the capacitor discharges to supply current to the primary winding 11a of the transforming device 11.

In the embodiment of the present invention shown in FIG. 1, there is provided a chopper circuit 30 which is adapted to short-circuit the input inductor 16. The chopper circuit 30 constitutes together with the inductor 16 and the diode 17 a power factor correction circuit of the present invention and comprises a second switching element 31 connected between a point between the input inductor 16 and the diode 17 and the other of the outputs of the input rectifier 2. The inductor 16 may be substituted by a transforming device (not shown).

In order to effect the ON-OFF operations of the switching element 31, the aforementioned control circuit 20 is connected through a driving circuit 33 with the gate of the second switching element 31. With this connection, the second switching element 31 is controlled to effect ON-OFF operations in a manner synchronized with the first switching element 18. As in the case of the driving circuit 21, the driving circuit 33 may have a function of relaying driving signals from the control circuit 20, and most simply, may comprise a resistor 33a.

The power factor correcting circuit comprised of the chopper circuit 30 including the switching element 31, the inductor 16 and the diode 17 is associated with a power factor correcting control circuit. The power factor correcting control circuit includes a current detecting device 32 for detecting the current through the switching element 31. In order to provide the power improving control circuit, there is also provided a normally open switch 34 which is connected with the gate of the second switching element 31 and normally functions to make the switching element non-conductive. For controlling the switch 34, there is provided a comparator 35. The comparator 35 has an inverting terminal which receives a reference voltage from a reference voltage circuit 36 and a non-inverting terminal which receives a current signal from the current detecting device 32 through a resistor 38. The comparator produces a high level output when the voltage of the current signal from the current detecting device 32 is higher than the reference voltage, and the high level output functions to turn the switch 34 on.

It will therefore be understood that in the circuit of this embodiment the second switching element 31 is turned off when the current through the second switching element 31 exceeds a predetermined value as determined by the reference voltage in the comparator 35 if both the switching elements 18 and 31 are in the conductive states so that the inductor 16 is short-circuited through the second switching element 31. As a result the energy stored in the inductor 16 during the ON period of the first switching element 18 can be restricted because the second switching element 31 is turned off when the current through the second switching element exceeds the predetermined value the energy charged to the capacitor 19 during the following off period of the first switching element 18 is correspondingly restricted.

The comparator 35 has a positive feedback resistor 37 which is connected between the output terminal and the non-inverting input terminal whereby a high signal produced in the output terminal causes a non-inverting feedback to the positive input terminal so that the output of the comparator 35 is maintained at the high level. The non-inverting input terminal of the comparator 35 is connected with the output terminal of the control circuit 20 through a diode 37a having a forward direction directed toward the control circuit 20. It will therefore be noted that when the output is decreased to the low level, the signal level at the positive input terminal of the comparator 35 falls to the low level so that the output of the comparator 35 is reset to the low level.

The embodiment of the present invention shown in FIG. 1 is provided with a circuit for varying the current value through the second switching element 31 under which the switch 34 is turned on, that is, the aforementioned predetermined value in accordance with the voltage of the capacitor 19. The circuit is the one which functions to apply the voltage signal from the capacitor 19 as a bias value to the current signal from the current detecting device 32 and is comprised of a circuit for connecting the positive electrode of the capacitor 19 through a resistor 39 with the positive terminal of the comparator 35.

Figures 2A, 2B:
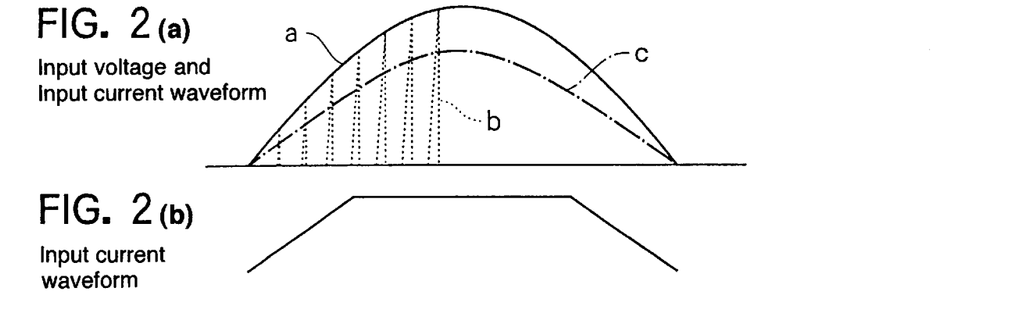
FIGS. 2(a)–(d) show input voltage wave form and various current wave forms in the embodiment of FIG. 1, wherein (a) shows input voltage and input current, (b) an input current wave form obtained in accordance with the present invention under a high input voltage, (c) current through the first switching element, and (d) current through the second switching element.

Operation of the switching type electric power device described above will now be explained below with reference to the diagrams shown in FIG. 2. Referring to FIG. 2(a), the solid line "a" designates a half wave of the input AC voltage. It will be noted that the input AC voltage varies along a sinusoidal curve. When the switching elements 18 and 31 are controlled by the control circuit 20 to effect ON-OFF operations, the input current produces a series of saw teeth waves as shown by dotted lines "b" which have peak values changing in accordance with changes in the input AC voltage along the sinusoidal curve. The saw teeth waves are passed through the AC filter 3 and the input capacitor 5 to be smoothened thereby to produce a sinusoidal wave form as shown by chain lines "c" in FIG. 2(a). Thus, the power factor is significantly improved.

Figure 2C:
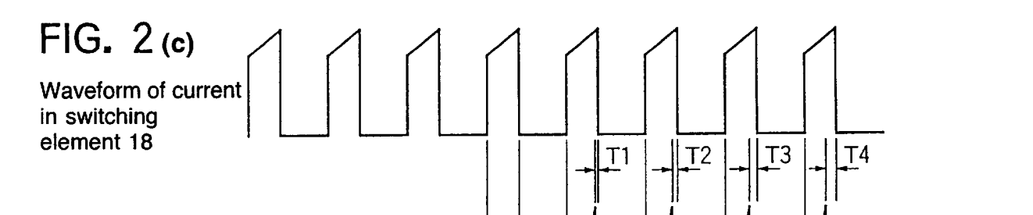

Energy is stored in the inductor 16 by the current flowing through the switching elements 18 and 31 during the ON period of the switching elements 18 and 31. In the following OFF period of the switching elements 18 and 31, the energy stored in the inductor 16 produces a current which flows through the charging circuit comprising the diode 17 into the input capacitor 19 to thereby charge the capacitor 19. The energy thus charged in the input capacitor 19 is then discharged in the following ON period of the switching element 18 through the primary winding 11a and the switching element 18. FIG. 2(c) shows the current wave form in the switching element 18.

As described above, the switching element 31 is controlled in a synchronized relationship with the switching element 18 so as to effect ON-OFF operations in identical timings with the switching element 18. The current through the switching element 31 is continuously detected by the current detecting device 32 during the ON period of the switching element 31. The detected value from the current detecting device 32 is applied to the positive input terminal of the comparator 35 and compared with the reference voltage from the reference voltage circuit 36. For example, when the current through the switching element 31 exceeds the predetermined value which is determined by the reference voltage from the reference voltage circuit 36 due to an increase in the input voltage, an output is produced in the comparator 35 so that the switch 34 is turned on and the switching element 31 is turned off. In this circuit, the output of the comparator 35 is maintained in the high level as long as the control circuit 20 is producing the driving signal due to the positive feedback for maintaining the switching elements 18 and 31 ON. When the driving signal disappears, the output of the comparator 35 is reset to low until the next driving signal is received.

When the switching element 31 is turned off, the short-circuiting circuit of the inductor 16 is interrupted so that the inductor 16 does not store further energy. As a results, the wave form of the input current assumes a shape having a flattened top as shown in FIG. 2(b).

Figure 2D:
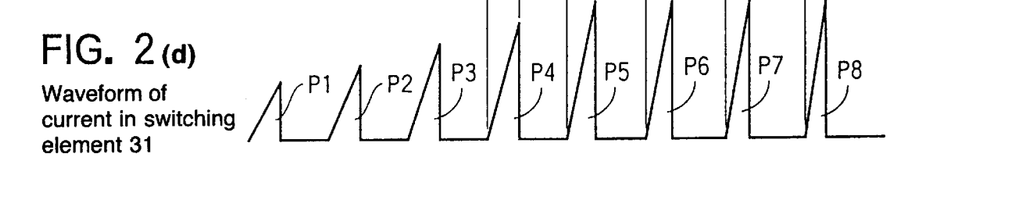

This will further be described with reference to FIGS. 2(c) and (d). FIG. 2(c) shows the wave form of the current pulse which is produced by the discharge of the capacitor 19 during the ON period of the switching element 18. As shown, the pulse rises in response to the switching element 18 being turned on and falls in response to the switching element 18 being turned off. FIG. 2(d) shows the current wave form in the switching element 31 which is of a form of pulse rising in response to the rising of the discharge current of the capacitor 19.

Referring to FIG. 2(d), it will be noted that the pulses P1 through P4 have pulse widths which are equal to those in the current pulses in the switching element 18. The pulse P5 is the one which is produced when the current through the switching element 31 is becoming higher than the predetermined value. The rising timing is synchronized with the current pulse in the switching element 18, however, the ending timing of the pulse is earlier by a timing T1 than the current pulse in the switching element 18. The succeeding pulse P6 rises with a timing which is synchronized with the current pulse in the switching element 18 and terminates earlier than the current pulse in the switching element 18 by a timing T2 which is greater than the timing T1. Similarly, as shown by timings T3 and T4, the terminating timings of the succeeding pulses P7, P8 are earlier than the corresponding timings of the current pulses in the switching element 18. As a result, the peak value of the current pulse in the switching element 31 is maintained substantially constant irrespective of an increase in the input voltage so as to produce a wave form as shown in FIG. 2(b) when it is smoothened. Thus, the energy stored in the inductor 16 is restricted so that excessive capacitor charge is accordingly prevented.

In the embodiment shown in FIG. 1, the charge voltage in the input capacitor 19 is applied as a bias voltage to the current signal in the switching element 31. In this instance, the switch 34 is turned on with a timing which is earlier by a timing corresponding to the bias voltage than a case having no bias. It will therefore be noted that the bias voltage functions to change the aforementioned predetermined value relating to the current value in the switching element under which the switch 34 is to be turned on.

It will further be noted that in accordance with the present invention, there may be provided a voltage detecting device 40 which is adapted to detect the voltage at the input rectifying circuit 2 and the detected voltage signal may be applied as a bias value to the positive terminal of the comparator 35. The voltage signal from the voltage detecting device 40 may be applied in lieu of or in addition to the voltage signal from the capacitor 19.

Figure 3A:
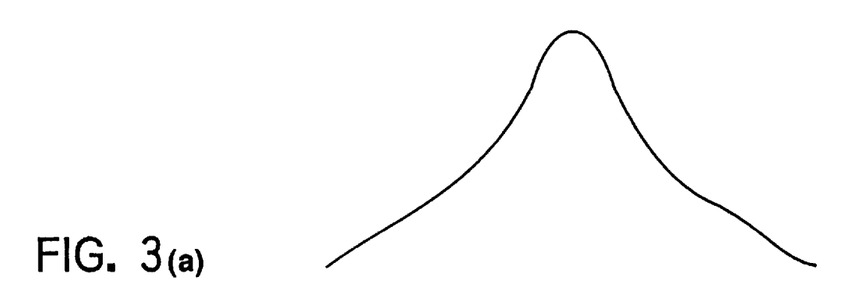
FIGS. 3(a)–(b) show effects of the input voltage detecting device in accordance with the embodiment of the present invention, wherein (a) shows an input voltage wave form without an input voltage detecting device, and (b) an input voltage wave form with such input voltage detecting device.
Figure 3B:
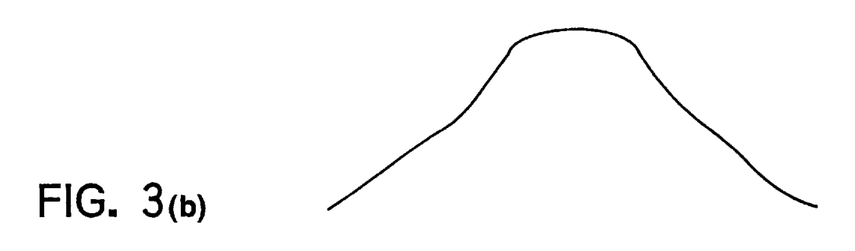

In the aforementioned embodiment wherein the voltage detecting device 40 is not provided, any delay in the operation of the control circuit produces an input current wave form which has a steep peak at the center portion as shown in FIG. 3(a). In the device shown in FIG. 1, it is possible to decrease the value of current under which the switching element 31 is turned off as the input voltage increases by providing the voltage detecting device 40 and applying to the comparator 35 a bias signal which corresponds to the input voltage. Thus, it is possible to provide an input current wave form which has a round top as shown in FIG. 3(b)

Figure 4:
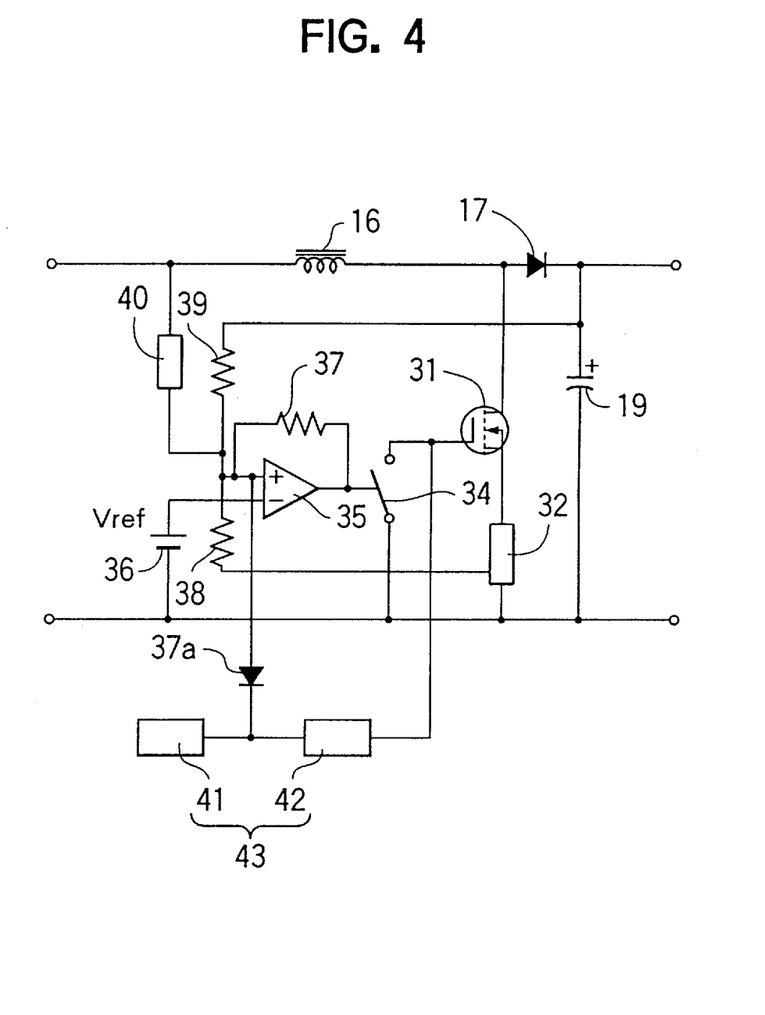
FIG. 4 is a circuit diagram showing a portion of a switching type power device in accordance with another embodiment of the present invention.

Referring to FIG. 4, there is shown another embodiment of the present invention wherein corresponding parts are designated by the same reference numerals and detailed description will be omitted. In the previous embodiment, the arrangements are such that the driving signal for actuating the second switching element 31 between the ON and OFF positions is derived from the control circuit 20 as in the case of the signal for the switching element 18. According to the present embodiment, however, an oscillator 41 is provided separately from the control circuit 20 to provide an output through a driving circuit 42 for actuating the switching element 31 between the ON and OFF positions. The oscillator 41 and the driving circuit 42 constitute a control circuit 43. For the control circuit 43, any conventional control IC, such as type $\mu$PC 1094 manufactured and marketed by NEC or type UC 3842 manufactured and marketed by Unitrode may be used.

The aforementioned control IC functions to produce driving signals in the driving circuit 42 based on the output pulses from the oscillator 41 and apply the driving signals to the switching element 31. By externally connecting appropriate resistors and capacitors to the control circuit 43, it is possible to determine as desired the frequency and the duration of the driving signal. In the circuit of the present embodiment, it is possible to use the driving signal from the driving circuit 42 for determining the duration of the time period wherein the switching element is conductive when the input voltage is low. In other respects, operations are the same as in the previous embodiment.

Figure 5:
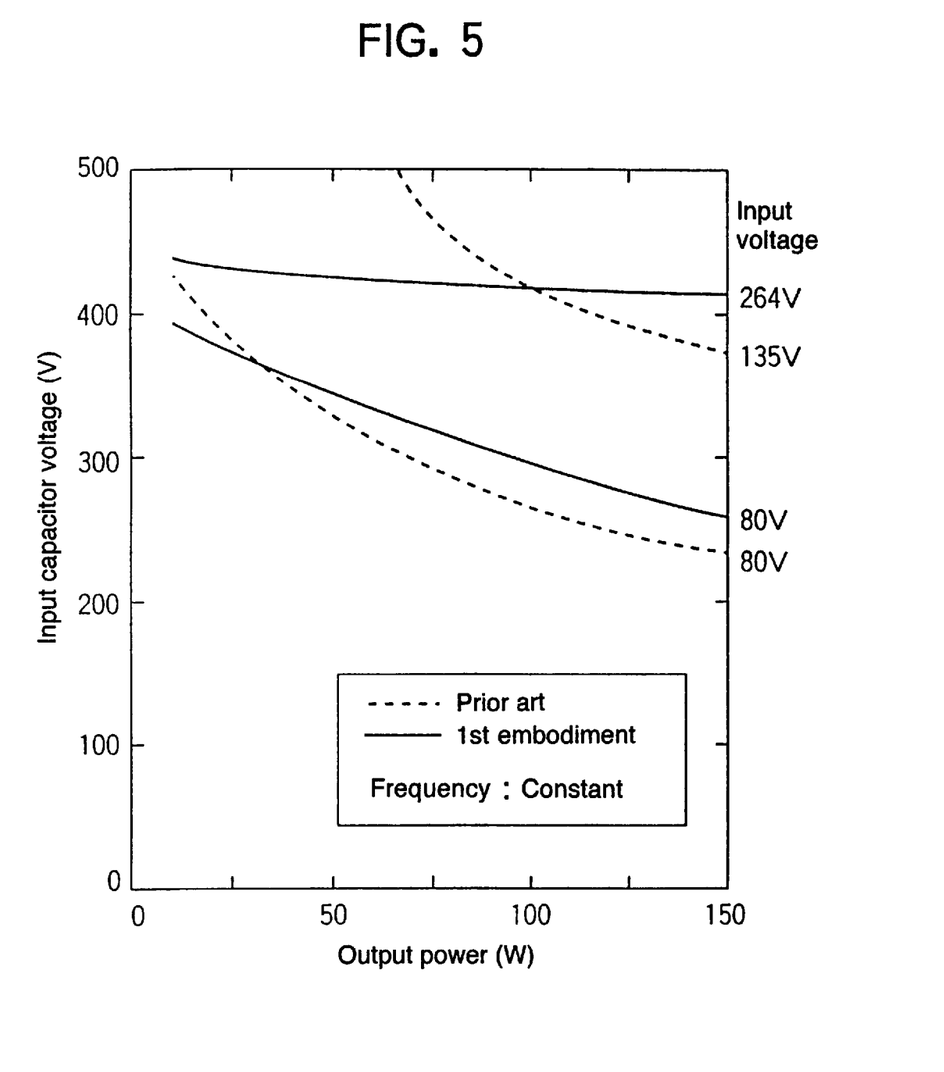

FIG. 5 shows comparisons between the voltage variations in the switching type electric power device in accordance with the present invention and those in a conventional DITHER type power device. In FIG. 5, solid lines show relationship between the output voltage and the input voltage in the device shown in FIG. 1 without the input voltage detecting device 40, the measurements having been made with the input voltage of 80V and 264V. The dotted lines show similar relationship in a conventional DITHER type device with the input voltage of 80V and 135V. In both cases, the switching elements are operated between the ON and OFF states with a frequency of 120 kHz, It will be apparent in FIG. 5 that in the embodiment of the present invention no significant variation in the voltage of the input capacitor even if there is a variation in the input voltage from 80V to 264V. However, in the conventional device, even under a constant input voltage of 80V, there is observed a significant variation in the voltage of the input capacitor in response to a variation in the output voltage. It should further be noted that, in the conventional device, the variation in the voltage of the input capacitor is so large under the input voltage of 135V that measurement is impossible in a low output voltage range.

As described above, in the switching type power device in accordance with the present invention, there is provided a second switching element for short-circuiting the inductor provided between the input rectifying circuit and the output converter. The current through this switching element is detected and the second switching element is turned off when the current exceeds a predetermined value. Thus, it is possible to restrict the energy stored in the inductor to thereby prevent the charge voltage of the input capacitor from becoming excessively high. Therefore, it is possible to use the device without any problem even under a condition where variations in the input voltage or in load are expected.

It should further be noted that the aforementioned control can be ensured by changing the value of current in the second switching element under which the second switching element is turned off, that is, the aforementioned predetermined value in accordance with the voltage of the input capacitor or the input voltage.

In the aforementioned embodiments, the power factor correcting circuit comprising the chopper circuit 30 including the second switching element, the inductor 16 and the diode 17 may be required to be constructed by components of different rating values depending on the rating power of the switching type power device. It should further be noted that the power factor correcting circuit is generally constructed using relatively large components. It is therefore convenient to provide the power factor correcting circuit in the switching type power device in a preassembled state.

Figures 6A, 6B:
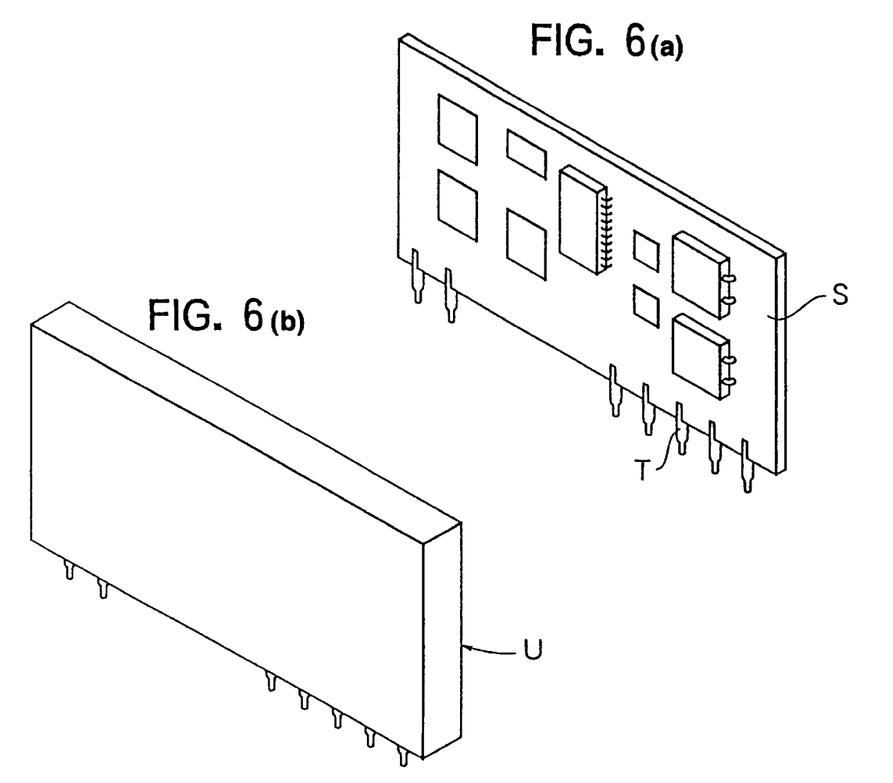

To the contrary, the power factor correcting control circuit is relatively free from the influence of the power device so that it can be constructed by relatively small components. It is therefore preferable to provide the power factor correcting control circuit as a unit so that it is externally connected with the power factor correcting circuit in the power device. FIG. 6(a) shows a structure of the power factor correcting control circuit formed as a unit. In this embodiment, the part encircled by a dash-and-dot line A in FIG. 1 is mounted on the board S to provide the power factor correcting control circuit. More specifically, the current detecting device 32 for detecting the current through the second switching element 31, the comparator 35, the reference voltage circuit 36, and the voltage detecting circuit 40 if this is to be provided, are mounted on the board S as components for the power factor correcting control circuit and connected as shown in FIG. 1 through resistors 37, 38 and 39 and the like. For external connection, a plurality of terminals T are arranged on the board S. In this instance, the terminals T are preferably arranged in series as shown along one edge of the board S. The power factor correcting control circuit thus formed on the board S is housed in a case which may be made of a plastic material to form a unit U.

Figure 6C:
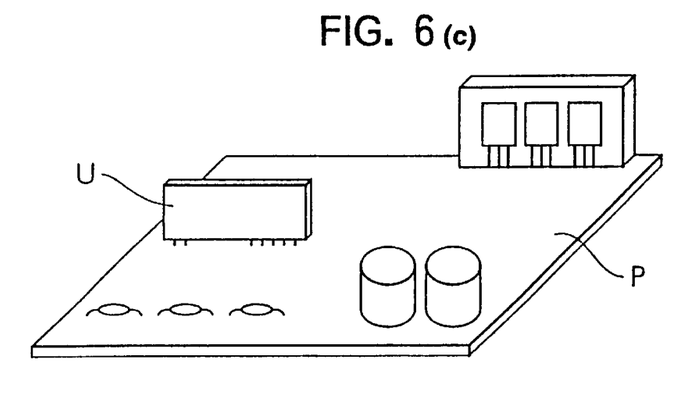

The unit U is connected through the terminals T with the main board P which has other components for the power device to complete the switching type power device. If the unit U is excessively large in size, some of the components for the power factor correcting control circuit may be placed on the main board P but not on the board S. For example, the current detecting device 32 may be mounted on the main board P and the comparator 35 and the switch 34 on the board S to provide the unit U. Alternatively, one or both of the comparator 35 and the switch 34 may be provided on the main board P and the remaining components on the board S to provide the unit U. Thus, the present invention shown in FIG. 6 is based on the concept of placing one or two or all of the current detecting device 32, the comparator 35 and the switch 34 on the board S to provide a unit.

The invention has thus been shown and described with reference to specific embodiments, however, it should be noted that the invention is in no way limited to the illustrated structures and the details of the arrangements but various modifications may be possible.

We claim:

1. A switching type electric power device comprising:

(a) an input rectifying circuit for effecting a full wave rectification on an AC input signal;

(b) an output converter circuit including a transforming device having a primary winding and a secondary winding, the primary winding being operatively coupled to paired outputs of said input rectifying circuit, said secondary winding being operatively coupled to an output rectifying circuit including a load, a first switching element controlled by a control circuit so as to alternately operate between ON and OFF states to thereby control a flow of current to said primary winding in an ON-OFF manner, and a capacitance device, the capacitance device being operatively coupled to said input rectifying circuit and the primary winding of said transforming device so that the capacitance device is charged during an OFF period of said first switching element and the capacitance device is discharged during an ON period of said first switching element through the primary winding of said transforming device;

(c) a power factor correcting circuit including an energy storage device connected with the paired outputs of said input rectifying circuit and adapted to be controlled by a second switching element, the energy storage device being adapted to store energy which is used to charge said capacitance device under control of said second switching element; and (d) an interrupting device for preventing over-charge of the capacitance device by making said second switching element non-conductive when current through said second switching element exceeds a predetermined value, the predetermined value being associated with the voltage of said capacitance device such that the predetermined value is decreased as the voltage of the capacitance device increases and the predetermined value is increased as the voltage of the capacitance device decreases;

wherein said control circuit controls said first switching element to alternately operate between ON and OFF states with a frequency that is faster than a frequency of said AC input signal, and controls said second switching element in synchronized relationship with said first switching element to operate between the ON and OFF states, unless said interrupting device causes said second switching element to be in said OFF state earlier than said first switching element by making said second switching element non-conductive.

2. A switching type power device in accordance with claim 1 wherein a voltage of said capacitance device is detected and said predetermined value under which said second switching element is made non-conductive is changed in accordance with the detected voltage of the capacitance device.

3. A switching type power device in accordance with claim 1 wherein an input voltage from said input rectifying circuit is detected and wherein said second switching element is made non-conductive in accordance with said detected input voltage.

4. A switching type power device in accordance with claim 3 further comprising a device for changing, based on the voltage of said capacitance device, the amount of current flow through said second switching element under which said comparator device operates.

5. A switching type power device in accordance with claim 1 wherein said interrupting device comprises:
   a current detecting device for detecting a current flowing through said second switching element;
   a comparator device for comparing a detected current value outputted by said current detecting device with a reference value; and,
   a switch for making said second switching element non-conductive when the detected current value exceeds said reference value.

6. A switching type power device in accordance with claim 5, further a circuit comprising for maintaining said second switching element in a conductive state as long as a driving signal is produced for making said second switching element conductive.

7. A switching type power device in accordance with claim 5 further comprising a device for changing, based on the input voltage from said input rectifying circuit, the amount of current flow through said second switching element under which said comparator device operates.

8. A switching type electric power device comprising:
   (a) an input rectifying circuit for effecting a full wave rectification on an AC input signal;
   (b) an output converter including a transforming device having a primary winding and a secondary winding, said secondary winding being operatively coupled through an output rectifying circuit including a load, said primary winding being operatively coupled at one end through an inductance device and a first diode device to one of paired outputs of said input rectifying circuit, the other end of said primary winding being operatively coupled with the other of said paired outputs of said input rectifying circuit through a first switching element which is controlled by a control circuit to alternately operate between ON and OFF states to control a flow of current to said primary winding in an ON-OFF manner;
   (c) a capacitance device operatively coupled in parallel with said primary winding and said first switching element so that said capacitance device is discharged through said primary winding during said ON state of said first switching element;
   (d) a second switching element operatively coupled in series to said paired outputs of said input rectifying circuit and said inductance device;
   (e) an ON-OFF control device for controlling said second switching element to alternately operate between ON and OFF states so that said capacitance device is charged during said OFF state through said inductance device and said diode device; and
   (f) an interrupting device for preventing over-charge of the capacitance device by overriding said control device in making said second switching element non-conductive when current through said second switching element exceeds a predetermined value, the predetermined value being associated with the voltage of said capacitance device such that the predetermined value is decreased as the voltage of the capacitance device increases and the predetermined value is increased as the voltage of the capacitance device decreases;
   wherein said control circuit controls said first switching element to alternately switch between the ON and OFF states with a frequency that is faster than a frequency of said AC input signal.

9. A switching type power device in accordance with claim 8 wherein said first switching element and said second switching element are controlled to operate in an ON-OFF manner in synchronized relation with each other.

10. A switching type power device in accordance with claim 9 wherein said control circuit concurrently controls the ON-OFF states of said second switching element and said first switching element.

11. A switching type power device in accordance with claim 8 wherein the ON-OFF control device comprises:
    an oscillating circuit having an oscillating frequency which is faster than a frequency of said AC input signal, and
    a driving circuit which is responsive to an output of said oscillating circuit for driving said second switching element.

12. A switching type power device in accordance with claim 11 wherein said driving circuit restricts a time period in which said second switching element is conductive.

13. A switching type electric power device in accordance with claim 8, further comprising an ON-OFF control device for controlling said second switching element, the ON-OFF control device comprising:
    an oscillating circuit having an oscillation frequency that is faster than a frequency of said AC input signal; and
    a driving circuit responsive to an output of said oscillating circuit for driving said second switching element.

14. A switching type power device in accordance with claim 13, wherein said driving circuit comprises a device which restricts a time period in which said second switching element is conductive.

15. A switching type power device in accordance with claim 8 wherein an input voltage from said input rectifying circuit is detected, and a time wherein said second switching element is made non-conductive is changed in accordance with said input voltage.

16. A switching type power device in accordance with claim 15, further comprising a device for changing, based on a voltage of said capacitance device, the amount of current flow through said second switching element under which said comparator device operates.

17. A switching type power device in accordance with claim 8, wherein said interrupting device comprises:
    a current detecting device for detecting current through said second switching element;

a comparator device for comparing a detected current value of said current detecting device with a reference value; and a switch for making said second switching element non-conductive when the detected current value exceeds said reference value.

18. A switching type power device in accordance with claim 17, further a circuit comprising for maintaining said second switching element in a conductive state as long as a driving signal is produced for making said second switching element conductive.

19. A power factor correcting control circuit for use with a switching type electric power device including a power factor correcting circuit, wherein said switching type electric power device comprises:

(a) an input rectifying circuit for effecting a full wave rectification on an AC input signal;

(b) an output converter circuit including a transforming device having a primary winding and a secondary winding, the primary winding being operatively coupled to paired outputs of said input rectifying circuit, said secondary winding being operatively coupled to an output rectifying circuit including a load, a first switching element controlled by a control circuit so as to alternately operate between ON and OFF states to thereby control a flow of current to said primary winding in an ON-OFF manner, and a capacitance device, the capacitance device being operatively coupled to said input rectifying circuit and the primary winding of said transforming device so that the capacitance device is charged during said OFF state of said first switching element and the capacitance device is discharged during said ON state of said first switching element through the primary winding of said transforming device; and (c) a power factor correcting circuit including an energy storage device connected with the paired outputs of said input rectifying circuit and adapted to be controlled by a second switching element, the energy storage device being adapted to store energy which is used to charge said capacitance device under control of said second switching element;

wherein said control circuit controls said first switching element to alternately operate between said ON and OFF states with a frequency that is faster than a frequency of said AC input signal, and controls said second switching element in synchronized relationship with said first switching element to operate between said ON and OFF states;

the power factor correcting control circuit comprising:

(1) a current detecting device for detecting current through said second switching element;

(2) a comparator device for comparing the current detected by said current detecting device against a predetermined value; and, (3) a switch for preventing over-charge of the capacitance device by overriding said control circuit in making said second switching element non-conductive when the current detected by the current detecting device exceeds the predetermined value, the predetermined value being associated with the voltage of said capacitance device such that the predetermined value is decreased as the voltage of the capacitance device increases and the predetermined value is increased as the voltage of the capacitance device decreases;

wherein said current detecting device, said comparator device and said switch are placed on a single board to form a unit.

20. A power factor correcting control circuit in accordance with claim 19 further comprising a circuit interposed between said comparator device and said switch for maintaining said switch in a conductive state for as long as a driving signal is provided for maintaining said second switching element in a conductive state.

21. A power factor correcting control circuit in accordance with claim 19 further comprising a device for changing, based on a voltage of said capacitance device, the amount of current flow through said second switching element during operation of said comparator device.

22. A power factor correcting control circuit in accordance with claim 19 further comprising a device for changing, based on the input voltage from said input rectifying circuit, the amount of current flow through said second switching element during operation of said comparator device.

23. A power factor correcting control circuit in accordance with claim 19 further comprising terminals for connecting the switching type power device, said terminals being positioned along an edge portion of said single board.

24. A power factor correcting control circuit for use with a switching type electric power device including a power factor correcting circuit, wherein said switching type electric power device comprises:

(a) an input rectifying circuit for effecting a full wave rectification on an AC input signal;

(b) an output converter circuit including a transforming device having a primary winding and a secondary winding, the primary winding being operatively coupled to paired outputs of said input rectifying circuit, said secondary winding being operatively coupled to an output rectifying circuit including a load, a first switching element controlled by a control circuit so as to alternately operate between ON and OFF states to thereby control a flow of current to said primary winding in an ON-OFF manner, and a capacitance device, the capacitance device being operatively coupled to said input rectifying circuit and the primary winding of said transforming device so that the capacitance device is charged during said OFF state of said first switching element and the capacitance device is discharged during said ON state of said first switching element through the primary winding of said transforming device; and (c) a power factor correcting circuit including an energy storage device connected with the paired outputs of said input rectifying circuit and adapted to be controlled by a second switching element, the energy storage device being adapted to store energy which is used to charge said capacitance device under control of said second switching element;

wherein said control circuit controls said first switching element to alternately operate between said ON and OFF states with a frequency that is faster than a frequency of said AC input signal, and controls said second switching element in synchronized relationship with said first switching element to operate between said ON and OFF states;

the power factor correcting control circuit comprising:

(1) a current detecting device for detecting current through said second switching element;

(2) a comparator device for comparing the current detected by said current detecting device against a predetermined value; and (3) a switch for preventing over-charge of the capacitance device by overriding said control circuit in making said second switching element nonconductive when the current detected by the current detecting device exceeds the predetermined value, the predetermined value being associated with the voltage of said capacitance device such that the predetermined value is decreased as the voltage of the capacitance device increases and the predetermined value is increased as the voltage of the capacitance device decreases;

wherein at least one of said current detecting device, said comparator device and said switch is placed on a single board to form a unit.

25. A power factor correcting control circuit in accordance with claim 18 wherein said comparator device and said switch for making said second switching element nonconductive are placed on said single board.

* * * * *